US012582121B2

(12) United States Patent
Mundhra et al.

(10) Patent No.: US 12,582,121 B2
(45) Date of Patent: Mar. 24, 2026

(54) SYNERGISTIC FUNGICIDAL COMPOSITION

(71) Applicants: JDM SCIENTIFIC RESEARCH ORGANISATION PRIVATE LIMITED, Vadodara (IN); SUMISHO AGRO INDIA PVT. LTD., Mumbai (IN)

(72) Inventors: Parikshit Mundhra, Delhi (IN); Jitendra Mohan, Delhi (IN)

( * ) Notice: Subject to any disclaimer, the term of this patent is extended or adjusted under 35 U.S.C. 154(b) by 805 days.

(21) Appl. No.: 17/619,019

(22) PCT Filed: Jun. 15, 2020

(86) PCT No.: PCT/IN2020/050528

§ 371 (c)(1),
(2) Date: Dec. 14, 2021

(87) PCT Pub. No.: WO2020/255160

PCT Pub. Date: Dec. 24, 2020

(65) Prior Publication Data

US 2022/0295790 A1 Sep. 22, 2022

(30) Foreign Application Priority Data

Jun. 15, 2019 (IN) ............................ 201921023829

(51) Int. Cl.
*A01N 37/50* (2006.01)
*A01N 43/16* (2006.01)

(52) U.S. Cl.
CPC ............. *A01N 37/50* (2013.01); *A01N 43/16* (2013.01)

(58) Field of Classification Search
CPC ........ A01N 37/50; A01N 43/16; A01N 43/78; A01N 43/653
See application file for complete search history.

(56) References Cited

U.S. PATENT DOCUMENTS

| | | | | |
|---|---|---|---|---|
| 2009/0182015 | A1* | 7/2009 | Kanayama | A01N 51/00 514/341 |
| 2010/0298247 | A1* | 11/2010 | Wilson | A01N 25/24 514/28 |
| 2011/0142802 | A1 | 6/2011 | Godwin et al. | |
| 2012/0034315 | A1* | 2/2012 | Hanagan | A01N 43/84 514/266.3 |
| 2016/0227772 | A1* | 8/2016 | Gewehr | A01N 37/22 |
| 2018/0014543 | A1* | 1/2018 | Kai | A01N 25/22 |

FOREIGN PATENT DOCUMENTS

| | | | |
|---|---|---|---|
| EP | 1872658 | A1 | 1/2008 |
| WO | 2008072783 | A1 | 6/2008 |
| WO | 2008075454 | A1 | 6/2008 |

OTHER PUBLICATIONS

Ataman Chemicals (1,2-Benzisothiazolin 20% (BIT 20%)) Retrieved Jun. 10, 2024. (Year: 2024).*

PCT International Search Report and Written Opinion dated Sep. 24, 2020 for International Application No. PCT IN2020/050528, 8 pages.

* cited by examiner

*Primary Examiner* — Frederick F Krass
*Assistant Examiner* — Abdulrahman Abbas
(74) *Attorney, Agent, or Firm* — RMCK Law Group, PLC

(57) ABSTRACT

The present invention relates to a synergistic fungicidal composition comprising a strobilurin based compound, validamycin and a compound A compound selected from the group comprising thifluzamide, hexaconazole, propiconazole, tricyclazole and difenoconazole. The composition of the present invention decreases application rates of each of the active ingredients and is non-phytotoxic.

8 Claims, 2 Drawing Sheets

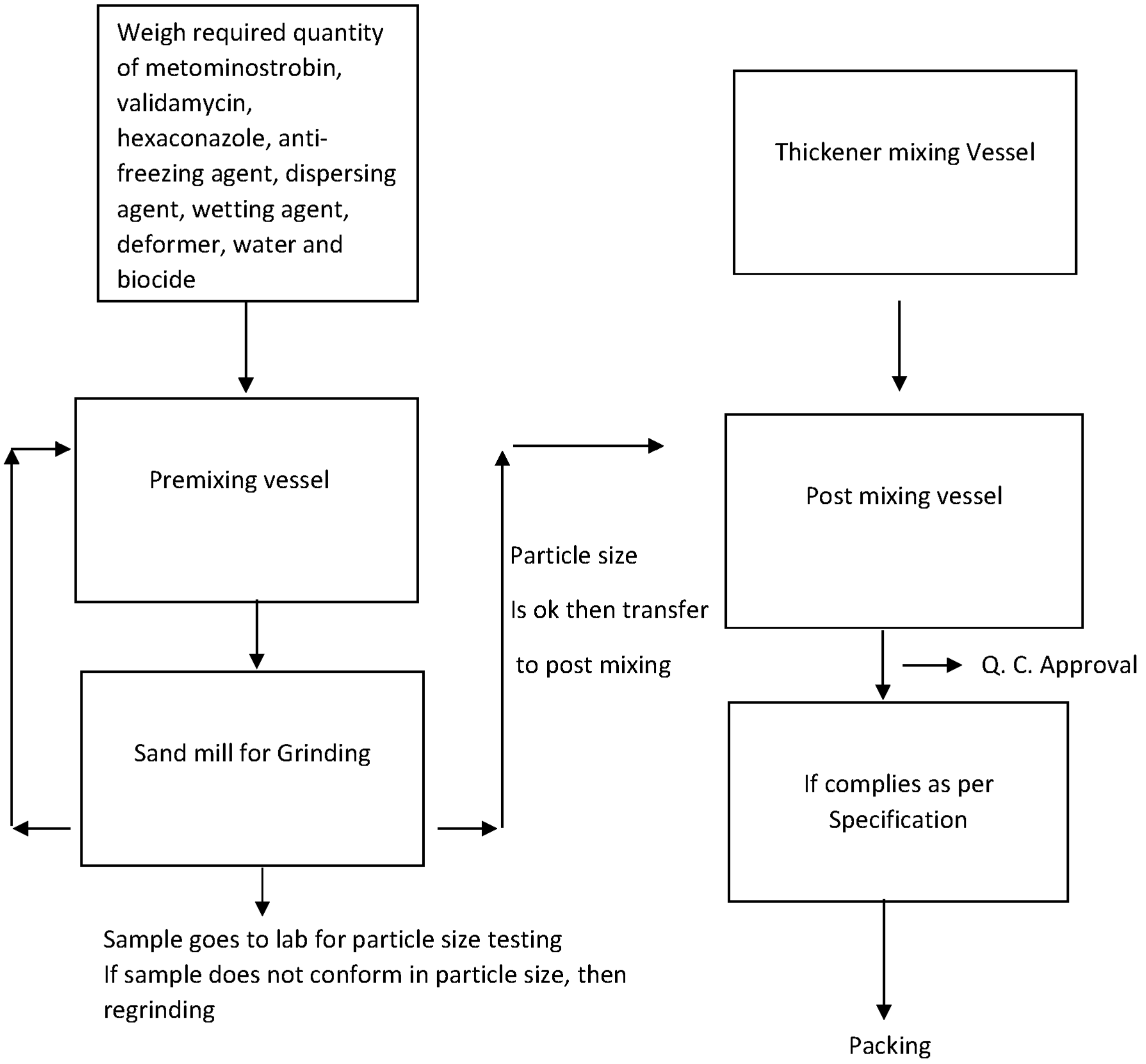

Figure 2

Weigh required quantity of metominostrobin, validamycin, hexaconazole, anti-freezing agent, dispersing agent, wetting agent, deformer, water and biocide Premixing vessel Sand mill for Grinding Sample goes to lab for particle size testing
If sample does not conform in particle size, then regrinding Particle size
Is ok then transfer
to post mixing Thickener mixing Vessel Post mixing vessel Q. C. Approval If complies as per Specification Packing

SYNERGISTIC FUNGICIDAL COMPOSITION

CROSS-REFERENCE TO RELATED APPLICATIONS

This application is a 371 U.S. National Stage of International Application No. PCT/IN2020/050528, filed Jun. 15, 2020, which claims priority to Indian Patent Application number 201921023829, filed Jun. 15, 2019. The disclosures of each of the above applications are incorporated herein by reference in their entirety.

FIELD OF THE INVENTION

The present invention relates to a synergistic fungicidal composition. More particularly, the present invention relates to a synergistic fungicidal composition comprising a strobilurin based compound, validamycin and a compound A selected from the group comprising thifluzamide, hexaconazole, propiconazole, tricyclazole and difenoconazole. The present invention also relates to a process for preparing such composition.

BACKGROUND OF THE INVENTION

Various compositions have been developed to control fungi and in practice have been used as a single or a mixed agent. Practical agricultural experience has shown that the repeated and exclusive application of an individual active compound in the control of harmful fungi leads in many cases to a rapid selection of those fungus strains which have developed natural or adapted resistance against the active compound in question. Effective control of these fungi with the active compound in question is very difficult in such cases.

The European patent application No. 1872658A1, provides a composition for preventing harmful organisms. The composition comprises a diamine derivative represented by the formula (1), (1)

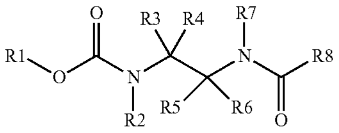

wherein, in the formula, R1 represents a hydrocarbon having 1 to 6 carbon atoms which is substituted with halogen or the like; R2 and R7 each independently represent a hydrogen atom, a hydrocarbon having 1 to 6 carbon atoms or the like; R3 and R4 each independently represent a hydrogen atom, a hydrocarbon having 1 to 6 carbon atoms which may be substituted or the like, or R3 and R4 represent a cycloalkyl group having 3 to 6 carbon atoms containing a carbon atom bonded thereto; R5 and R6 each independently represent a hydrogen atom, a hydrocarbon group having 1 to 6 carbon atoms or the like; and R8 represents an arylalkyl group which may be substituted, an aryl group which may be substituted or a heteroaryl group which may be substituted. The composition further comprises one or more compounds selected from the group consisting of other fungicides, insecticides and acaricides as active ingredients.

WO 2008075454 provides a composition comprising a compound of formula 1 or 5 to be combined with pesticidal agents.

(1)

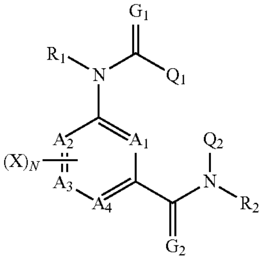

(5)

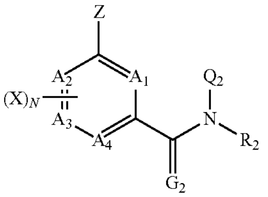

In the formulae (1) and (5), A1, A2, A3 and A4 respectively represent a carbon atom, a nitrogen atom or an oxidized nitrogen atom; R1 and R2 independently represent a hydrogen atom, a C1-C4 alkyl group or a C1-C4 alkylcarbonyl group; G1 and G2 independently represent an oxygen atom or a sulfur atom; and X's may be the same or different and represent a hydrogen atom, a halogen atom, a C1-C3 alkyl group or a trifluoromethyl group. It provides a long list of pesticidal agents including metominostrobilurin, validamycin, tricyclazole, hexaconazole, propiconazole or thifluzamide.

European Patent No. 2094087 relates to a pesticidal composition comprising an anthranilamide compound or its salt and other insecticide and/or fungicide.

To reduce the risk of the selection of resistant fungus strains, mixtures of different active compounds are nowadays conventionally employed for controlling harmful fungi. By combining active compounds having different mechanisms of action, it is possible to ensure successful control over a relatively long period of time.

Thus there exist a need to develop a novel fungicidal compositions showing a broader scope of activity and a synergistic effect in order to avoid or to control the development of resistant strains to the active ingredients or to the mixtures of known active ingredients used by the farmer while minimising the doses of chemical products spread in the environment and reducing the cost of the treatment. A need also exists for synergistic compositions which shall be physico-chemically compatible formulations in the form of storage stable, safely packed and ready to use formulation.

SUMMARY OF THE INVENTION

The inventors of the present invention have surprisingly found that a composition comprising a strobilurin based compound, validamycin and a compound A selected from the group comprising thifluzamide, hexaconazole, propiconazole, tricyclazole and difenoconazole provides enhanced synergistic fungicidal action.

Accordingly, the present invention provides a synergistic composition comprising a strobilurin based compound, validamycin and a compound A selected from the group comprising thifluzamide, hexaconazole, propiconazole, tricyclazole and difenoconazole and at least one excipient.

In an embodiment the composition of the present invention, comprises the strobilurin based compound in an amount in the range from 0.1 to 20% w/w; validamycin in an amount in the range from 0.1 to 12% w/w; and compound A in an amount in the range from 0.1 to 35 w/w.

In another embodiment the composition of the present invention, comprises the strobilurin based compound selected from the group comprising azoxystrobin, dimoxystrobin, enestroburin, fluoxastrobin, kresoxim-methyl, metominostrobin, orysastrobin, picoxystrobin, pyraclostrobin, trifloxystrobin and enestroburin.

In a preferable embodiment, the strobilurin based compound in the composition of the present invention is metominostrobin.

In an embodiment of the invention, if compound A is thifluzamide, the amount of thifluzamide present in the composition is in the range of 5 to 14% w/w. In an alternative embodiment, if compound A is hexaconazole, the amount of hexaconazole present in the composition is in the range of 0.1 to 10% w/w. In an alternative embodiment, if compound A is propiconazole, the amount of propiconazole present in the composition is in the range of 8 to 15% w/w. In an alternative embodiment, if compound A is tricyclazole, the amount of tricyclazole present in the composition is in the range of 15 to 30% w/w. In an alternative embodiment, if compound A is difenoconazole, the amount of difenoconazole present in the composition is in the range of 5 to 10% w/w.

In yet another embodiment the composition of the present invention is one of:

a) metominostrobin, validamycin, thifluzamide and at least one excipient,
b) metominostrobin, validamycin, hexaconazole and at least one excipient,
c) metominostrobin, validamycin, propiconazole and at least one excipient,
d) metominostrobin, validamycin, tricyclazole and at least one excipient, or
e) metominostrobin, validamycin, difenoconazole and at least one excipient.

In an embodiment the composition of the present invention is one of:

a) metominostrobin present in an amount in the range from 1 to 20% w/w, validamycin present in an amount in the range from 0.1 to 12% w/w, thifluzamide present in an amount in the range from 5 to 14% w/w and at least one excipient, or
b) metominostrobin present in an amount in the range from 1 to 20% w/w, validamycin present in an amount in the range from 0.1 to 12% w/w, hexaconazole present in an amount in the range from 0.1 to 10% w/w and at least one excipient.

In another embodiment the composition of the present invention is one of:

a) metominostrobin present in an amount of 10% w/w, validamycin present in an amount of 6% w/w, thifluzamide present in an amount of 9% w/w and at least one excipient, or
b) metominostrobin present in an amount of 10% w/w, validamycin present in an amount of 6% w/w, hexaconazole present in an amount of 5% w/w and at least one excipient.

In another embodiment, the composition is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG), Wettable powder (WP), Water dispersible powder for slurry seed treatment (WS), Water dispersible tablet (WT), a mixed formulation of CS and SC (ZC) or A mixed formulation of CS and SE (ZE), a mixed formulation of CS and EW (ZW).

In a preferred embodiment the composition of the present invention is formulated as suspension concentrate.

In an embodiment the composition of the present invention comprises at least one excipient selected from the group comprising dispersing agent, wetting agent, anti-freezing agent, defoamer, biocide and thickener.

In yet another embodiment, the dispersing agent is selected from the group comprising, but not limited to, amine salt of phosphate tristyryl phenol ethoxylated, acrylic copolymer, graft copolymer and combinations thereof, and present in an amount in the range from 2 to 10% w/w.

In one another embodiment, the wetting agent is selected from the group comprising, but not limited to, ethoxylated polyarylphenol phosphate ester, dioctyl sulphosuccinate, non-ionic ethoxylate and combinations thereof, and present in an amount in the range from 1 to 5% w/w.

In an embodiment, the anti-freezing agent is selected from the group comprising, but not limited to, propylene glycol, diethylene glycol, monoethylene glycol and combinations thereof, and present in an amount in the range from 2 to 10% w/w.

In another embodiment, the defoamer is dimethyl polysiloxane emulsion and present in an amount in the range from 0.01 to 0.5% w/w.

In one another embodiment, the biocide is selected from the group comprising of, but not limited to, 20% aqueous dipropylene glycol solution of 1,2-benzisothiazolin-3-one, formaldehyde and combinations thereof and present in an amount in the range from 0.01 to 0.50% w/w.

In another embodiment, the thickener is xanthan gum and is present in an amount in the range from 0.01 to 0.50% w/w.

In one another embodiment, the present invention provides a process for the preparation of a synergistic fungicidal composition comprising, mixing strobilurin based compound, validamycin, a compound A selected from the group comprising thifluzamide, hexaconazole, propiconazole, tricyclazole and difenoconazole, and at least one excipient.

BRIEF DESCRIPTION OF DRAWINGS

FIG. 2. is a flowchart for preparing synergistic fungicidal composition comprising metominostrobin, validamycin and hexaconazole in the form of suspension concentrate.

DETAILED DESCRIPTION OF THE INVENTION

Figure 1:
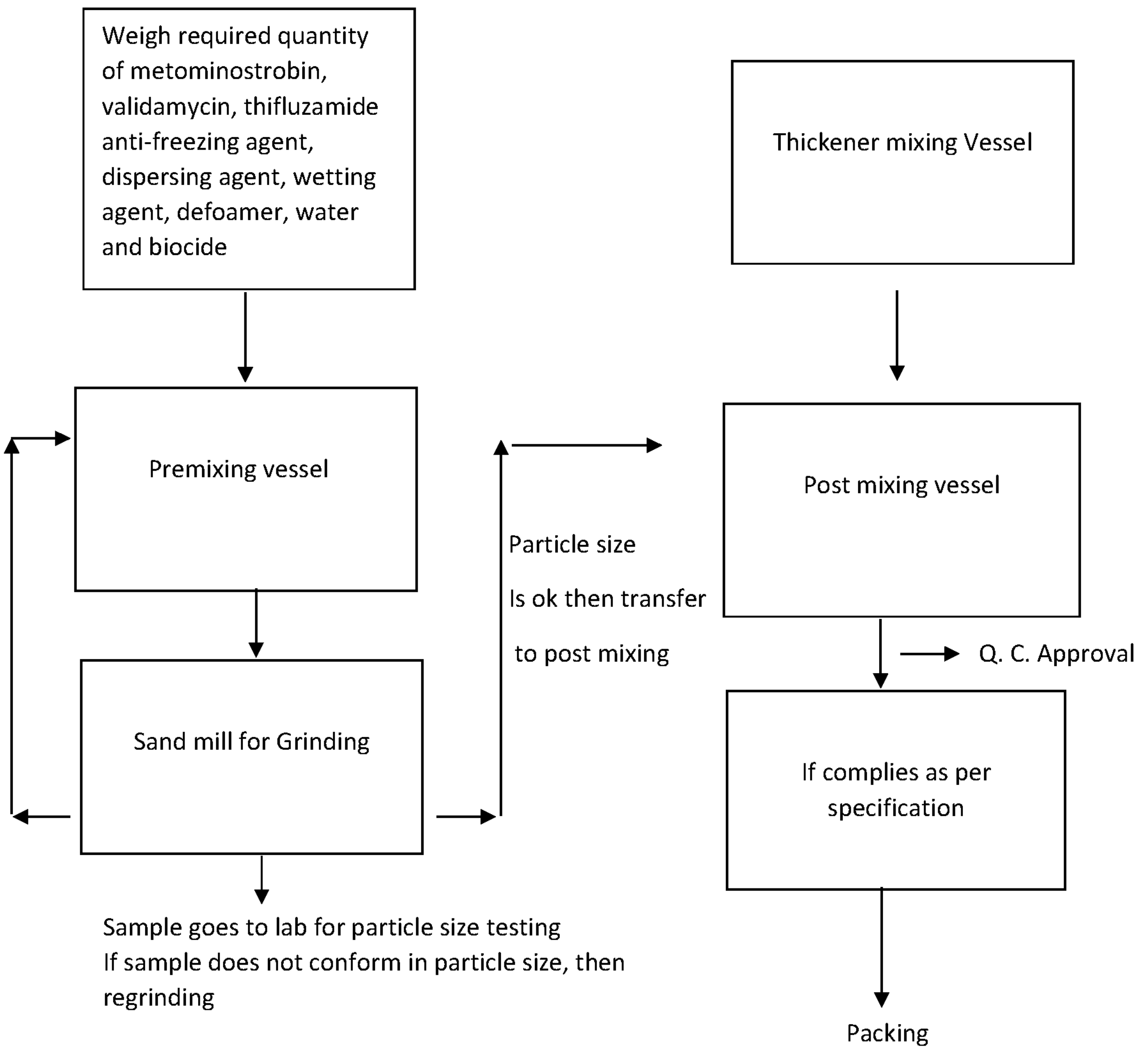
FIG. 1. is a flowchart for preparing synergistic fungicidal composition comprising metominostrobin, validamycin and thifluzamide in the form of suspension concentrate.

Discussed below are some representative embodiments of the present invention. The invention in its broader aspects is not limited to the specific details and representative methods. The illustrative examples are described in this section in connection with the embodiments and methods provided. The invention according to its various aspects is particularly pointed out and distinctly claimed in the appended claims read in view of this specification and appropriate equivalents.

It is to be noted that, as used in the specification and the appended claims, the singular forms “a”, “an” and “the” include plural referents unless the context clearly dictates otherwise. Thus, for example, reference to a composition containing “a compound” includes a mixture of two or more compounds. It should also be noted that the term “or” is generally employed in its sense including “and/or” unless the content clearly dictates otherwise.

The expression of various quantities in terms of “% w/w” or “%” means the percentage by weight, relative to the weight of the total solution or composition unless otherwise specified.

The term “active ingredient” (a.i.) or “active agent” used herein refers to that component of the composition responsible for control of insects or pests.

Strobilurins are a group of chemical compounds which are used in agriculture as fungicides. They are part of the larger group of quinone outside inhibitors (QoI), which act to inhibit the respiratory chain at the level of Complex III. They have a suppressive effect on other fungi, reducing competition for nutrients; they inhibit electron transfer in mitochondria, disrupting metabolism and preventing growth of the target fungi. Some strobilurins are azoxystrobin, kresoxim-methyl, picoxystrobin, fluoxastrobin, oryzastrobin, dimoxystrobin, pyraclostrobin, trifloxystrobin, coumoxystrobin, enoxastrobin, flufenoxystrobin, mandestrobin, fenaminostrobin and metominostrobin.

Metominostrobin (IUPAC name: (E)-2-methoxyimino-N-methyl-2-(2-phenoxyphenyl) acetamide) acts by inhibiting cytochrome pathway between cytochrome b and cytochrome $c_1$, at the ubiquinol oxidising site. It is used for control of *Pyricuaria oryzae* on rice.

Validamycin (IUPAC name: (1R,2R,3 S,4 S,6R)-2,3-dihydroxy-6-hydroxymethyl-4-[(1S,4R,5S,65)-4,5,6-trihydroxy-3-hydroxymethylcyclohex-2-enylamino]cyclohexyl-β-D-glucopyranoside) is a non-systemic antibiotic with a fungistatic action. It causes abnormal branching of the tips of the pathogen, followed by cessation of further development. It inhibits trehalase, an enzyme which mediates the digestion of the carbohydrate trehalose and transport of glucose to the hyphals tips. Validamycin controls the fungus *Rhizoctonia solani* in rice, potatoes, vegetables, strawberries, tobacco, ginger and other crops, damping-off diseases of cotton, rice, sugar beet etc.

Thifluzamide (IUPAC name: 2',6'-dibromo-2-methyl-4'-trifluoromethoxy-4-trifluoromethyl-1,3-thiazole-5-carboxanilide) is a fungicide which is generally used to control Basidiomycetes on rice, potatoes, maize and amenity grass. It inhibits succinate dehydrogenase (complex II) in the tricarboxylic acid cycle.

Hexaconazole (IUPAC name: (RS)-2-(2,4-dichlorophenyl)-1-(1H-1,2,4-triazol-1-yl)hexan-2-ol) is a systemic fungicide with protective and curative action. It inhibits ergosterol biosynthesis (sterol demethylation inhibitor). Hexaconazole controls many fungi, particularly Ascomycetes and Basidiomycetes of apples, vines, coffee, peanuts, banana, cucurbits, peppers and other crops.

Propiconazole ((IUPAC name: 2RS,4RS;2RS,4SR)-1-[2-(2,4-dichlorophenyl)-4-propyl-1,3-dioxolan-2-ylmethyl]-1H-1,2,4-triazole) is a systemic foliar fungicide with preventive and curative action, with translocation acropetally in the xylem. It is used on cereals, bananas, rice, coffee, peanuts, stone-fruit and maize for control of different types of fungal species by acting as sterol demethylation (ergosterol biosynthesis) inhibitor.

Tricyclazole (IUPAC name: 5-methyl-1,2,4-triazolo[3,4-b][1,3]benzothiazole) is a systemic fungicide, absorbed rapidly by the roots and foliage and translocated in the xylem and apoplast within the plant. It is a melanin biosynthesis inhibitor (reduction of 1,3,8-trihydroxynapththalene and vermelone). It controls rice blast in transplanted and direct-seeded rice.

Difenconazole (IUPAC name: 3-chloro-4-[(2RS,4RS; 2RS,4SR)-4-methyl-2-(1H-1,2,4-triazol-1-ylmethyl)-1,3-dioxolan-2-yl]phenyl 4-chlorophenyl ether) is a systemic fungicide with preventive and curative action. It is absorbed by the leaves with acropetal and strong translaminar translocation. It provides long-lasting preventive and curative activity against Ascomycetes, Basidiomycetes and Deuteromycetes by inhibition of sterol demethylation as well as cell membrane ergosterol biosynthesis leading to stoppage of development of the fungus. It is used against disease complexes in grapes, pome fruit, stone fruit, patotoes, sugar beet, oilseed rape, bananas, cereals, rice, soybeans, ornamentals and vegetable crops.

The present invention provides a synergistic fungicidal composition comprising a strobilurin based compound, validamycin and a compound A selected from the group comprising thifluzamide, hexaconazole, propiconazole, tricyclazole and difenoconazole and at least one excipient.

In an embodiment, the composition according to the present invention comprises the strobilurin based compound in an amount in the range from 0.1 to 20% w/w, validamycin in an amount in the range from 0.1 to 12% w/w, and compound A in an amount in the range from 0.1 to 35 w/w.

Non-limitative examples of strobilurin based compound according to the present invention may include azoxystrobin, dimoxystrobin, enestroburin, fluoxastrobin, kresoxim-methyl, metominostrobin, orysastrobin, picoxystrobin, pyraclostrobin, trifloxystrobin and enestroburin. In a preferred embodiment, the strobilurin based compound is metominostrobin.

In an embodiment of the present invention, if compound A is thifluzamide, the amount of thifluzamide present in the composition is in the range of 5 to 14% w/w. In an alternative embodiment, if compound A is hexaconazole, the amount of hexaconazole present in the composition is in the range of 0.1 to 10% w/w. In an alternative embodiment, if compound A is propiconazole, the amount of propiconazole present in the composition is in the range of 8 to 15% w/w. In an alternative embodiment, if compound A is tricyclazole, the amount of tricyclazole present in the composition is in the range of 15 to 30% w/w. In an alternative embodiment, if compound A is difenoconazole, the amount of difenoconazole present in the composition is in the range of 5 to 10% w/w.

Non limitative examples of suitable composition according to the present invention may include mixtures of: a) metominostrobin, validamycin, thifluzamide and at least one excipient, b) metominostrobin, validamycin, hexaconazole and at least one excipient, c) metominostrobin, validamycin, propiconazole and at least one excipient, d) metominostrobin, validamycin, tricyc lazole and at least one excipient, or e) metominostrobin, validamycin, difenoconazole and at least one excipient.

Preferred example of a suitable composition according to the present invention may be a mixture of: a) metominostrobin present in an amount in the range from 1 to 20% w/w, validamycin present in an amount in the range from 0.1 to 12% w/w, thifluzamide present in an amount in the range from 5 to 14% w/w and at least one excipient, or b) metominostrobin present in an amount in the range from 1 to 20% w/w, validamycin present in an amount in the range from 0.1 to 12% w/w, hexaconazole present in an amount in the range from 0.1 to 10% w/w and at least one excipient.

In a most preferred embodiment, the synergistic fungicidal composition comprises metominostrobin in an amount of 10% w/w, validamycin in an amount of 6% w/w, thifluzamide in an amount of 9% w/w and at least one excipient.

In another most preferred embodiment, the synergistic fungicidal composition comprises metominostrobin in an amount of 10% w/w, validamycin in an amount of 6% w/w, hexaconazole in an amount of 5% w/w and at least one excipient.

In an embodiment, the ratio between metominostrobin: (validamycin+thifluzamide) is in the range of 1:1 to 1:2. In a preferred embodiment, the ratio between validamycin and thifluzamide is in the range of 1:1 to 1:2.

In another embodiment, the ratio between metominostrobin: (validamycin+hexaconazole) is in the range of 1:0.5 to 1:2. In a preferred embodiment, the ratio between validamycin and hexaconazole is in the range of 0.5:1 to 1.5:1.

In yet another embodiment, the synergistic composition of the present invention may be formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG), Wettable powder (WP), Water dispersible powder for slurry seed treatment (WS), Water dispersible tablet (WT), A mixed formulation of CS and SC (ZC), A mixed formulation of CS and SE (ZE), A mixed formulation of CS and EW (ZW).

In a preferred embodiment, the composition of the present invention is formulated as a suspension concentrate (SC). The term "suspension concentrate" used herein refers to a suspension of the active ingredients and excipients in a small quantity of liquid, usually water.

It is generally observed that solid particles in a liquid undergo spontaneous aggregation to form lumps. Hence, it is recommended to add a dispersing agent which prevents agglomeration of solid particles and keep them suspended in fluid. Accordingly, the composition of the present invention contains dispersing agents such as amine salt of phosphate tristyryl phenol ethoxylated, acrylic copolymer, graft copolymer, naphthalene sulphonate of formaldehyde condensate, acrylic copolymer, lignin based sulphonate. One or more dispersing agents may be used in the synergistic composition of the present invention. The dispersing agent is present in an amount in the range from 2 to 10% w/w.

Wetting is the first stage of dispersion, in which air surrounding the granular composition is substituted with water. Wetting of the composition with water cannot occur if the surface tension of the liquid is very high. Hence, it is recommended to add a wetting agent to the composition to facilitate the process of dispersion of the granules in the liquid. Non-limiting examples of wetting agents that can be used in the present invention include ethoxylated polyarylphenol phosphate ester, dioctyl sulphosuccinate, non-ionic ethoxylate, dioctyl sulfosuccinate, sodium lauryl sulfate, naphthalene alkyl aryl sulphonate. The alkyl aryl sulphonates in which the alkyl group contains approximately 1 to 5 carbon atoms and in which the aryl nucleus is selected from the group consisting of benzene and naphthalene. One or more wetting agents may be used in the synergistic composition of the present invention. The wetting agent is present in an amount in the range from 1 to 5% w/w.

An anti-freezing agent is generally added to the composition, to prevent the aqueous compositions from freezing. Suitable anti-freezing agents useful herein, but not limited to, include propylene glycol, diethylene glycol, monoethylene glycol and combinations thereof. Preferably, the anti-freezing agent is present in an amount in the range from 2 to 10% w/w.

A defoamer, also called as anti-foaming agent, is generally added to the composition as foam formation prevents the efficient filling of a container. Preferably, the defoamer is polydimethyl siloxane emulsion. In the composition of the present invention the defoamer is present in an amount in the range from 0.01 to 0.5% w/w.

The synergistic fungicidal composition comprises a biocide selected from the group consisting of 20% aqueous dipropylene glycol solution of 1,2-benzisothiazolin-3-one, formaldehyde and combinations thereof, and present in an amount in the range from 0.01 to 0.50% w/w. The biocide is added to the composition of the present invention for its preservation against spoilage from bacteria, yeasts and fungi.

It is necessary to add a thickener to the composition to reduce the tendency of the composition to disperse when sprayed, and decrease the likelihood of it being rinsed off from the crops. Preferably, the synergistic fungicidal composition comprises xanthan gum as thickener in an amount in the range from 0.01 to 0.50% w/w. Xanthan gum used in the present invention is obtained from commercial source.

The composition according to the present invention may further comprise an additional component such as a surfactant, an agriculturally acceptable support, carrier or filler, protective colloids, adhesives, thixotropic agents, penetration agents, stabilisers, sequestering agents.

In an embodiment, the present invention provides a process for the preparation of a synergistic fungicidal composition. The process comprises mixing strobilurin based compound, validamycin, a compound selected from the group comprising thifluzamide, hexaconazole, propiconazole, tricyclazole or difenoconazole, and at least one excipient.

In another embodiment, the present invention provides a process for the preparation of synergistic fungicidal composition in suspension concentrate form. The process comprises diluting dispersing agent and wetting agent in demineralized water and solubilizing by high shear mixing to obtain a solution. To the solution, active ingredients, anti-freezing agent, defoamer, biocide are added and mixed to obtain a homogeneous mass. The mass is then grinded in a mill to obtain the mean particle size below 5 microns. To the grinded mass, water solution of thickener is added under low stirring to obtain the synergistic fungicidal composition of the present invention in suspension concentrate form.

The synergistic composition of the present invention is found to be effective to control wide variety of fungal diseases, by way of example, Blast (Neck and leaf), Sheath blight and also Bacterial leaf blight in paddy. The synergistic composition is also effective to control Mildew, Early and Late blight, Rot in fruits and vegetables, cereals and other crops.

The inventors of the present invention have surprisingly found that the composition of the present invention is synergetic in nature. The synergetic composition of the present invention is more effective than their individual counterparts or when two actives are taken together. The synergetic composition of the present invention also makes it possible to use markedly smaller quantities of the active ingredients as compared to their individual counterparts. This allows a substantial reduction in the application rates of each of these active ingredients, while maintaining good efficacy. The decrease in application rates reduces treatment cost to the farmer and also eases the burden on the environment both from manufacturing waste and crop protection chemical residues.

The synergistic fungicidal composition of present invention provides a wide spectrum control of fungi, delays the emergence of the resistant strains, minimizing the risk of development of resistance, and achieves effective and economical control of undesired fungi.

The synergistic composition of the present invention provides a number of other advantages—

- Increased efficacy in comparison to the other formulations tested during the trial
- Economically beneficial to the farmers as it provides better yield of the crop with reduction in the number of sprays
- Reduced possibility of hazards to the farmers due to occupational exposure because of reduction in the number of sprays
- Is storage stable
- Is non-phytotoxic
- Environmental friendly The embodiments of the present invention are more particularly described in the following examples that are intended as illustrations only, since numerous modifications and variations within the scope of the present invention will be apparent to those of skill in the art. Unless otherwise noted, all parts, percentages and ratios reported in the following examples are on a weight basis and all reagents used in the examples were obtained or are available from the chemical suppliers.

EXAMPLES

The synergistic fungicidal composition of the present invention comprising metominostrobin, validamycin and thifluzamide in the form of suspension concentrate is provided in Table 1. The unit of each component of the composition are expressed in "% w/w" i.e. the percentage by weight, relative to the weight of the total solution or composition.

TABLE 1

Synergistic fungicidal composition of the present invention comprising metominostrobin, validamycin and thifluzamide in suspension concentrate (SC) form

| S. No. | Component | Function | Quantity (% w/w) |
|---|---|---|---|
| 1 | Metominostrobin | Active ingredient | 10.00 |
| 2 | Validamycin | Active ingredient | 06.00 |
| 3 | Thifluzamide | Active ingredient | 09.00 |
| 4 | Propylene glycol/Diethylene glycol/Monoethylene glycol | Anti-freezing agent | 2-10 |
| 5 | Amine salt of phosphate tristyryl phenol ethoxylated/ Acrylic copolymer/Graft polymer | Dispersing agent | 2-10 |
| 6 | Ethoxylated polyaryl phenol phosphate ester/Non-ionic ethoxylate/Dioctyl sulphosuccinate | Wetting agent | 1-5 |
| 7 | Dimethyl Polysiloxane emulsion | Defoamer | 0.01-0.50 |
| 8 | 20% aqueous dipropylene glycol solution of 1,2-benzisothiazolin-3-one/Formaldehyde | Biocide | 0.01-0.50 |
| 9 | Xanthan Gum | Thickener | 0.01-0.50 |
| 10 | Demineralised water | Solvent | Q.S |

QS: quantity sufficient required to make 100% w/w formulation

Table 2 provides quantities of active ingredients and raw material charged to prepare the synergistic composition of the present invention in SC form. The active ingredients are in technical grade. The entries for active ingredients, in table 2 varies from that of table 1, as the entries in table 1 are for 100% pure compounds whereas the entries in table 2 are for technical ones with certain percentage of impurities. Hence, metominostrobin 10% w/w, validamycin 6% w/w and thifluzamide 9% w/w of 100% purity of Table 1 corresponds to metominostrobin 10.10 g of 99% purity, validamycin 9.38 g of 64% purity and thifluzamide 9.47 g of 95% purity of Table 2.

TABLE 2

Quantities of active ingredients and raw material charged

| S. No. | Components | Amount (g) |
|---|---|---|
| 1 | Metominostrobin (Basis of 99%) | 10.10 |
| 2 | Validamycin (Basis of 64%) | 09.38 |
| 3 | Thifluzamide (Basis of 95%) | 09.47 |
| 4 | Propylene glycol | 04.00 |
| 5 | Graft copolymer | 05.00 |
| 6 | Non-ionic ethoxylate | 03.00 |
| 7 | Dimethyl Polysiloxane emulsion | 0.15 |
| 8 | 20% aqueous dipropylene glycol solution of 1,2-benzisothiazolin-3-one | 0.20 |
| 9 | Xanthan gum | 0.15 |
| 10 | Demineralised water | 58.55 |

Example 1: Process of Preparing Synergistic Insecticidal Composition Comprising Metominostrobin, Validamycin and Thifluzamide in Suspension Concentrate (SC) Form All the components were weighed as per table 2. The graft copolymer (5 g) and non-ionic ethoxylate (3 g) were diluted in demineralised water and solubilized by high shear mixing. Then propylene glycol (4 g), metominostrobin (10.10 g), validamycin (9.38 g) and thifluzamide (9.47 g), dimethyl polysiloxane emulsion (0.15 g), 20% aqueous dipropylene glycol solution of 1,2-benzisothiazolin-3-one (0.20 g) were added and mixed to obtain a homogeneous mass. The homogeneous mass was grinded in bead mill. The grinding was carried out until a mean particle size below 5(D-90) microns was obtained. After grinding, 2% water solution of xanthan gum was added under low stirring to obtain the title fungicidal composition.

TABLE 3

Synergistic fungicidal composition of the present invention comprising metominostrobin, validamycin and hexaconazole in suspension concentrate (SC) form

| S. No. | Component | Function | Quantity (% w/w) |
|---|---|---|---|
| 1 | Metominostrobin | Active ingredient | 10.00 |
| 2 | Validamycin | Active ingredient | 06.00 |
| 3 | Hexaconazole | Active ingredient | 05.00 |
| 4 | Propylene glycol/Diethylene glycol/Monoethylene glycol | Anti-freezing agent | 2-10 |
| 5 | Amine salt of phosphate tristyryl phenol ethoxylated/ Acrylic copolymer/Graft polymer | Dispersing agent | 2-10 |
| 6 | Ethoxylated polyaryl phenol phosphate ester/Non-ionic ethoxylate/Dioctyl sulphosuccinate | Wetting agent | 1-5 |
| 7 | Dimethyl Polysiloxane emulsion | Defoamer | 0.01-0.50 |
| 8 | 20% aqueous dipropylene glycol solution of 1,2-benzisothiazolin-3-one/Formaldehyde | Biocide | 0.01-0.50 |
| 9 | Xanthan Gum | Thickener | 0.01-0.50 |
| 10 | Demineralised water | Solvent | Q.S |

QS: quantity sufficient required to make 100% w/w formulation

Table 4 provides quantities of active ingredients and raw material charged to prepare the synergistic composition of the present invention in SC form. The active ingredients are in technical grade. The entries for active ingredients, in table 4 varies from that of table 3, as the entries in table 3 are for 100% pure compounds whereas the entries in table 4 are for technical ones with certain percentage of impurities. Hence, metominostrobin 10% w/w, validamycin 6% w/w and hexaconazole 5% w/w of 100% purity of table 3 corresponds to metominostrobin 10.10 g of 99% purity, validamycin 9.38 g of 64% purity and hexaconazole 5.44 g of 92% purity of table 4.

TABLE 4

Quantities of active ingredients and raw material charged

| S. No. | Components | Amount (g) |
|---|---|---|
| 1 | Metominostrobin (Basis of 99%) | 10.10 |
| 2 | Validamycin (Basis of 64%) | 09.38 |
| 3 | Hexaconazole (Basis of 92%) | 05.44 |
| 4 | Propylene glycol | 05.00 |
| 5 | Graft copolymer | 05.00 |
| 6 | Non-ionic ethoxylate | 03.00 |
| 7 | Dimethyl Polysiloxane emulsion | 0.12 |
| 8 | 20% aqueous dipropylene glycol solution of 1,2-benzisothiazolin-3-one | 0.20 |
| 9 | Xanthan gum | 0.15 |
| 10 | Demineralised water | 61.61 |

Example 2: Process of Preparing Synergistic Insecticidal Composition Comprising Metominostrobin, Validamycin and Hexaconazole in Suspension Concentrate (SC) Form All the components were weighed as per table 4. The graft copolymer (5 g) and non-ionic ethoxylate (3 g) were diluted in demineralised water and solubilized by high shear mixing. Then propylene glycol (5 g), metominostrobin (10.10 g), validamycin (9.38 g) and hexaconazole (5.44 g), dimethyl polysiloxane emulsion (0.12 g), 20% aqueous dipropylene glycol solution of 1,2-benzisothiazolin-3-one (0.20 g) were added and mixed to obtain a homogeneous mass. The homogeneous mass was grinded in bead mill. The grinding was carried out until a mean particle size below 5(D-90) microns was obtained. After grinding, 2% water solution of xanthan gum was added under low stirring to obtain the title fungicidal composition.

Evaluation of Synergistic Effect of the Fungicidal Composition of the Present Invention A synergistic effect exists whenever the action of an active ingredient combination is greater than the sum of the actions of the individual components. Synergism was calculated by using Colby's method, *Weeds*, vol 15 No. 1(January 1967), pp 20-2.

The synergistic action expected for a given combination of two active components can be calculated as follows:

$$E = X + Y - \frac{XY}{100}$$

The synergistic action expected for a given combination of three active components can be calculated as follows:

$$E = X + Y + Z - \frac{\{XY + YZ + XZ\}}{100} + \frac{(XYZ)}{10000}$$

Where:

E represents expected percentage of fungicidal control for the combination of the three fungicides at defined doses (for example equal to x, y and z respectively), X is the percentage of fungicidal control observed by the compound (I) at a defined dose (equal to x), Y is the percentage of fungicidal control observed by the compound (II) at a defined dose (equal to y), Z is the percentage of fungicidal control observed by the compound (III) at a defined dose (equal to z).

When the percentage of fungicidal control observed for the combination is greater than the expected percentage, there is a synergistic effect.

$$\text{Ratio} = \frac{\text{Observed control \%}}{\text{Expected control \%}}$$

Ratio of O/E>1, synergism observed

Greenhouse Experiment for Synergy

To evaluate the synergistic effect, test plants (paddy seedlings) are cultivated in the greenhouse. Seedlings are transplanting in trays measuring 1 mts×0.5 mts and allowed to grow for one week prior to application of test compounds. Test plants are inoculated by infesting with Blast (Neck and leaf), Sheath blight and Bacterial leaf blight. The treated plants are maintained in the greenhouse at 21° to 28° C. for the duration of the experiment.

Test compounds were weighed as per the treatment details provided in table 5 and 6. Required quantity of samples are diluted in de-mineralized water. The mixtures are prepared no earlier than 0.5 hour before spraying. Test compounds are applied as foliar spray applications six days after inoculation. For each treatment, four trays each are sprayed in a spraying chamber using about 20 ml spray wash. After drying, the plants are returned to the greenhouse and maintained at 20° to 25° C. The treated plants are evaluated for disease control as compared to control (untreated plant).

The percentage of leaf area infected of three individual leaves per pot is estimated. The % disease control of each treatment is determined using the formula shown below:

$$\%\ \text{control} = 100 - \frac{\%\ \text{level of disease of treated plant}}{\%\ \text{level of disease of untreated plant}} \times 100$$

For all the combinations, the expected % control is calculated using Colby's formula as provided above.

Table 5 and 6 summarize the synergistic impact of the compositions of the present invention i.e. Metominostrobin 10%+Validamycin 6%+Thifluzamide 9% SC and Metominostrobin 10%+Validamycin 6%+Hexaconazole 5% SC.

TABLE 5

Synergistic effect of fungicide combination of the present invention (Metominostrobin 10% + Validamycin 6% + Thifluzamide 9% SC) in Paddy crop

| Treatment details | a.i. (g/ha) | Observed disease control % | Expected disease Control % | Colby's Ratio |
|---|---|---|---|---|
| Metominostrobin 10% + Validamycin 6% + Thifluzamide 9% SC | 80 + 48 + 72 | 70.78 | 66.80 | 1.060 |
| Metominostrobin 20% SC + Thifluzamide 24% SC (Tank-mix) | 80 + 72 | 45.10 | 54.71 | 0.824 |
| Metominostrobin 20% SC + Validamycin 3% L (Tank-mix) | 80 + 48 | 53.18 | 50.79 | 1.047 |
| Thifluzamide 24% SC + Validamycin 3% L (Tank-mix) | 72 + 48 | 47.66 | 50.52 | 0.943 |
| Metominostrobin 20% SC | 80 | 32.89 | — | |
| Thifluzamide 24% SC | 72 | 32.52 | — | |
| Validamycin 3% L | 48 | 26.68 | — | |
| Metominostrobin 10% + Validamycin 6% + Thifluzamide 9% SC | 100 + 60 + 90 | 83.01 | 74.76 | 1.110 |
| Metominostrobin 20% SC + Thifluzamide 24% SC (Tank-mix) | 100 + 90 | 47.86 | 60.00 | 0.798 |

TABLE 5-continued

Synergistic effect of fungicide combination of the present invention (Metominostrobin 10% + Validamycin 6% + Thifluzamide 9% SC) in Paddy crop

| Treatment details | a.i. (g/ha) | Observed disease control % | Expected disease Control % | Colby's Ratio |
|---|---|---|---|---|
| Metominostrobin 20% SC + Validamycin 3% L (Tank-mix) | 100 + 60 | 63.15 | 61.01 | 1.039 |
| Thifluzamide 24% SC + Validamycin 3% L (Tank-mix) | 90 + 60 | 53.25 | 59.16 | 0.900 |
| Metominostrobin 20% SC | 100 | 38.20 | — | |
| Thifluzamide 24% SC | 90 | 35.27 | — | |
| Validamycin 3% L | 60 | 36.91 | — | |
| Metominostrobin 10% + Validamycin 6% + Thifluzamide 9% SC | 120 + 72 + 108 | 87.68 | 86.18 | 1.017 |
| Metominostrobin 20% SC + Thifluzamide 24% SC (Tank-mix) | 120 + 108 | 50.64 | 72.47 | 0.699 |
| Metominostrobin 20% SC + Validamycin 3% L (Tank-mix) | 120 + 72 | 67.19 | 75.09 | 0.895 |
| Thifluzamide 24% SC + Validamycin 3% L (Tank-mix) | 108 + 72 | 55.70 | 72.16 | 0.772 |
| Metominostrobin 20% SC | 120 | 50.37 | — | |
| Thifluzamide 24% SC | 108 | 44.53 | — | |
| Validamycin 3% L | 72 | 49.81 | — | |

* Disease control is taken for overall percent disease control in treated pots against overall percent disease control in control pots

TABLE 6

Synergistic effect of fungicide combination of the present invention (Metominostrobin 10% + Validamycin 6% + Hexaconazole 5% SC) in Paddy crop

| Product | a.i. (g/ha) | Observed disease control % | Expected disease Control % | Colby's Ratio |
|---|---|---|---|---|
| Metominostrobin 10% + Validamycin 6% + Hexaconazole 5% SC | 80 + 48 + 40 | 74.51 | 68.77 | 1.083 |
| Metominostrobin 20% SC + Hexaconazole 5% SC (Tank-mix) | 80 + 40 | 48.49 | 57.41 | 0.845 |
| Metominostrobin 20% SC + Validamycin 3% L (Tank-mix) | 80 + 48 | 53.18 | 50.79 | 1.047 |
| Hexaconazole 5% SC + Validamycin 3% L (Tank-mix) | 40 + 48 | 52.37 | 53.47 | 0.979 |

TABLE 6-continued

Synergistic effect of fungicide combination of the present invention (Metominostrobin 10% + Validamycin 6% + Hexaconazole 5% SC) in Paddy crop

| Product | a.i. (g/ha) | Observed disease control % | Expected disease Control % | Colby's Ratio |
|---|---|---|---|---|
| Metominostrobin 20% SC | 80 | 32.89 | — | |
| Hexaconazole 5% SC | 40 | 36.54 | — | |
| Validamycin 3% L | 48 | 26.68 | — | |
| Metominostrobin 10% + Validamycin 6% + Hexaconazole 5% SC | 100 + 60 + 50 | 89.26 | 76.82 | 1.162 |
| Metominostrobin 20% SC + Hexaconazole 5% SC (Tank-mix) | 100 + 50 | 53.18 | 63.25 | 0.841 |
| Metominostrobin 20% SC + Validamycin 3% L (Tank-mix) | 100 + 60 | 63.39 | 61.01 | 1.039 |
| Hexaconazole 5% SC + Validamycin 3% L (Tank-mix) | 50 + 60 | 59.83 | 62.49 | 0.957 |
| Metominostrobin 20% SC | 100 | 38.20 | — | |
| Hexaconazole 5% SC | 50 | 40.54 | — | |
| Validamycin 3% L | 60 | 36.91 | — | |
| Metominostrobin 10% + Validamycin 6% + Hexaconazole 5% SC | 120 + 72 + 60 | 90.52 | 88.57 | 1.022 |
| Metominostrobin 20% SC + Hexaconazole 5% SC (Tank-mix) | 120 + 60 | 56.90 | 77.22 | 0.737 |
| Metominostrobin 20% SC + Validamycin 3% L (Tank-mix) | 120 + 72 | 67.19 | 75.09 | 0.895 |
| Hexaconazole 5% SC + Validamycin 3% L (Tank-mix) | 60 + 72 | 64.02 | 76.96 | 0.832 |
| Metominostrobin 20% SC | 120 | 50.37 | — | |
| Hexaconazole 5% SC | 60 | 54.10 | — | |
| Validamycin 3% L | 72 | 49.81 | — | |

* Disease control is taken for overall percent disease control in treated plots against overall percent disease control in control pots It is evident from Table 5 and 6 that the fungicidal composition of the present invention (Metominostrobin 10%+Validamycin 6%+Thifluzamide 9% SC and Metominostrobin 10%+Validamycin 6%+Hexaconazole 5% SC) is synergistic.

Bio-Efficacy of the Fungicidal Composition of the Present Invention

Details of the Experiment

A field trial was conducted on paddy to evaluate the control of diseases i.e. Leaf and Neck blast, Sheath Blight and Bacteria Leaf Blight with metominostrobin, validamycin, thifluzamide, and hexaconazole alone, binary mixture (tank-mix) and tertiary mixture, as a foliar application. The tertiary mixture was prepared by the process described in example 1 and 2. The formulations viz. metominostrobin 20% SC, validamycin 3% L, thifluzamide 24% SC and hexaconazole 5% SC were diluted with water to the stated concentration of the active compound. The treatment details were provided in column 2 of Table 7 and 8.

The experiment was laid out in Randomized Block Design (RBD) with four replications. The plot size was 25 sq·m. All the recommended agronomic practices were followed throughout the cropping period. Applications were made with a domestic sprayer fitted with a pressure regulator and hollow cone nozzle. The rate of application was 500 l/ha for all the trials. The various fungicidal compositions as per Table 7 and 8 were sprayed on paddy to evaluate the control of Leaf and Neck blast, Sheath Blight and Bacteria Leaf Blight. Based on various doses, weighed quantity of test products were dissolved in 1.25 litres of water/treatment and sprayed uniformly twice at an interval of 15 days. The percentage disease incidence (PDI) per hill on the ten hills per plot was assessed 14 days post-application (DAA) after each application. Mean of Percentage Disease Index (PDI) after two applications were recorded and depicted in the below table. Yield was also recorded.

TABLE 7

Bio-efficacy of fungicidal combination (Metominostrobin 10% + Validamycin 6% + Thifluzamide 9% SC) against major diseases in Paddy crop

| | | | | Percent Disease Index (PDI) *Mean after two applications | | | |
|---|---|---|---|---|---|---|---|
| S. No. | Treatment | Dose (ml/ha) | a.i./ha | Leaf and Neck Blast | Sheath Blight | Bacterial Leaf Blight | Yield (q/ha) |
| 1. | Metominostrobin 10% + Validamycin 6% + Thifluzamide 9% + SC | 800 | 80 + 48 + 72 | 13.92 (21.91) | 6.76 (15.07) | 10.48 (18.89) | 46.90 |
| 2. | Metominostrobin 10% + Validamycin 6% + Thifluzamide 9% + SC | 1000 | 100 + 60 + 90 | 12.13 (20.38) | 5.17 (13.14) | 7.26 (15.63) | 47.98 |
| 3. | Metominostrobin 10% + Validamycin 6% + Thifluzamide 9% + SC | 1200 | 120 + 72 + 108 | 10.75 (19.14) | 4.92 (12.82) | 6.05 (14.24) | 48.26 |

TABLE 7-continued

Bio-efficacy of fungicidal combination (Metominostrobin 10% + Validamycin 6% + Thifluzamide 9% SC) against major diseases in Paddy crop

| S. No. | Treatment | Dose (ml/ha) | a.i./ha | Percent Disease Index (PDI) *Mean after two applications: Leaf and Neck Blast | Sheath Blight | Bacterial Leaf Blight | Yield (q/ha) |
|---|---|---|---|---|---|---|---|
| 4. | Metominostrobin 20% SC + Thifluzamide 24% SC (Tank mix) | 500 + 375 | 100 + 90 | 15.90 (23.50) | 8.76 (17.22) | 9.54 (17.99) | 45.68 |
| 5. | Metominostrobin 20% SC + Validamycin 3% L (Tank mix) | 500 + 2000 | 100 + 60 | 15.01 (22.79) | 9.70 (18.15) | 16.80 (24.20) | 45.16 |
| 6. | Thifluzamide 24% SC + Validamycin 3% L (Tank mix) | 375 + 2000 | 90 + 60 | 29.81 (33.09) | 7.24 (15.61) | 11.68 (19.98) | 44.73 |
| 7. | Metominostrobin 20% SC | 500 | 100 | 20.59 (26.99) | 16.13 (23.68) | 19.21 (25.99) | 40.38 |
| 8. | Thifluzamide 24% SC | 375 | 90 | 34.50 (35.97) | 11.41 (19.74) | 17.00 (24.35) | 39.70 |
| 9. | Validamycin 3% L | 2000 | 60 | 31.88 (34.38) | 15.68 (23.33) | 19.85 (26.46) | 34.90 |
| 10. | Control | — | | 41.34 (40.01) | 21.28 (27.47) | 36.43 (37.13) | 31.20 |
| | SE(m) | — | | 0.830 | 0.412 | 0.676 | 0.443 |
| | C.D. | — | | 2.484 | 1.235 | 2.025 | 1.326 |

Figure in parenthesis represents arc sin transformed value
PDI: Percent Disease Index
*(Mean observation/per hill)

TABLE 8

Bio-efficacy of fungicidal combination (Metominostrobin 10% + Validamycin 6% + Hexaconazole 5% SC) against major diseases in Paddy crop

| S. No. | Treatment | Dose (ml/ha) | a.i./ha | Percent Disease Index (PDI) *Mean after two applications: Leaf and Neck Blast | Sheath Blight | Bacterial Leaf Blight | Yield (q/ha) |
|---|---|---|---|---|---|---|---|
| 1. | Metominostrobin 10% + Validamycin 6% + Hexaconazole 5% SC | 800 | 80 + 48 + 40 | 11.10 (19.46) | 7.00 (15.34) | 9.28 (17.74) | 47.28 |
| 2. | Metominostrobin 10% + Validamycin 6% + Hexaconazole 5% SC | 1000 | 100 + 60 + 50 | 8.60 (17.05) | 5.48 (13.54) | 6.85 (15.17) | 48.11 |
| 3. | Metominostrobin 10% + Validamycin 6% + Hexaconazole 5% SC | 1200 | 120 + 72 + 60 | 7.88 (16.30) | 5.06 (13.00) | 5.14 (13.10) | 48.60 |
| 4. | Metominostrobin 20% SC + Hexaconazole 5% SC (Tank mix) | 500 + 1000 | 100 + 50 | 13.46 (21.52) | 12.54 (20.74) | 13.26 (21.35) | 45.72 |
| 5. | Metominostrobin 20% SC + Validamycin 3% L (Tank mix) | 500 + 2000 | 100 + 60 | 15.01 (22.79) | 9.70 (18.15) | 16.80 (24.20) | 45.16 |
| 6. | Hexaconazole 5% SC + Validamycin 3% L (Tank mix) | 1000 + 2000 | 50 + 60 | 23.04 (28.69) | 13.98 (21.96) | 15.94 (23.53) | 42.90 |
| 7. | Metominostrobin 20% SC | 500 | 100 | 20.59 (26.99) | 16.13 (23.68) | 19.21 (25.99) | 40.38 |
| 8. | Hexaconazole 5% SC | 1000 | 50 | 24.33 (29.55) | 17.38 (24.64) | 21.60 (27.69) | 37.26 |
| 9. | Validamycin 3% L | 2000 | 60 | 31.88 (34.38) | 15.68 (23.33) | 19.85 (26.46) | 34.90 |
| 10. | Control | — | | 41.34 (40.01) | 21.28 (27.47) | 36.43 (37.13) | 31.20 |
| | SE(m) | — | | 0.824 | 0.418 | 0.686 | 0.459 |
| | C.D. | — | | 2.467 | 1.251 | 2.054 | 1.375 |

Figure in parenthesis represents arc sin transformed value
PDI: Percent Disease Index
*(Mean observation/per hill)

Phytotoxic Effect

In the above field trial, phytotoxicity was assessed for the synergistic composition of the present invention. For phytotoxicity evaluation on paddy, following observations were made by observing temporary or long lasting damage to the leaves if any viz., leaf injury on tips and leaf surface, wilting, vein clearing, necrosis, epinasty and hyponasty after 3, 5, 7 and 14 DAS of the synergistic fungicidal composition of the present invention and mean scoring is presented in the table. Crop injury was observed on visual rating from 1-10 scale as given in Table 9. Table 10 provides phytotoxic effect of the synergistic composition of the present invention on paddy.

TABLE 9

| Rating | Crop Injury (%) | Verbal Description |
|---|---|---|
| 0 | — | No symptoms |
| 1 | 1-10 | Very slight discoloration |
| 2 | 11-20 | More severe, but not lasting |
| 3 | 21-30 | Moderate and more lasting |
| 4 | 31-40 | Medium and lasting |
| 5 | 41-50 | Moderately heavy |
| 6 | 51-60 | Heavy |
| 7 | 61-70 | Very Heavy |
| 8 | 71-80 | Nearly destroyed |
| 9 | 81-90 | Destroyed |
| 10 | 91-100 | Completely destroyed |

TABLE 10

Phytotoxic effect of synergistic composition of the present invention on paddy

| Treatments | Dose (ml/ha) | Phytotoxicity rating | | | | | |
|---|---|---|---|---|---|---|---|
| | | Leaf tip injury | Wilting | Vein Clearing | Necrosis | Epinasty | Hyponasty |
| Metominostrobin 10% + Thifluzamide 9% + Validamycin 6% SC | 800 | 0 | 0 | 0 | 0 | 0 | 0 |
| Metominostrobin 10% + Thifluzamide 9% + Validamycin 6% SC | 1000 | 0 | 0 | 0 | 0 | 0 | 0 |
| Metominostrobin 10% + Thifluzamide 9% + Validamycin 6% SC | 1200 | 0 | 0 | 0 | 0 | 0 | 0 |
| Metominostrobin 10% + Hexaconazole 5% + Validamycin 6% SC | 800 | 0 | 0 | 0 | 0 | 0 | 0 |
| Metominostrobin 10% + Hexaconazole 5% + Validamycin 6% SC | 1000 | 0 | 0 | 0 | 0 | 0 | 0 |
| Metominostrobin 10% + Hexaconazole 5% + Validamycin 6% SC | 1200 | 0 | 0 | 0 | 0 | 0 | 0 |

The synergistic fungicidal composition of the present invention gave good control of fungal diseases as compared to the reference products. Further, the use of the synergistic fungicidal composition resulted in better crop condition, i.e. fresh green leaves and did not produce any phytotoxic symptoms on the plants.

From the foregoing it will be observed that numerous modifications and variations can be effectuated without departing from the true spirit and scope of the novel concepts of the present invention. It is to be understood that no limitations with respect to the specific embodiments illustrated is intended or should be inferred. It should be understood that all such modifications and improvements have been deleted herein for the sake of conciseness and readability but are properly within the scope of the following claims.

The invention claimed is:

1. A synergistic fungicidal composition characterized in that the composition comprises:

a) metominostrobin present in an amount of 10% w/w, validamycin present in an amount of 6% w/w, thifluzamide present in an amount of 9% w/w and at least one excipient, or b) metominostrobin present in an amount of 10% w/w, validamycin present in an amount of 6% w/w, hexaconazole present in an amount of 5% w/w and at least one excipient, wherein the composition is formulated as a suspension concentrate.

2. The synergistic fungicidal composition, as claimed in claim 1, characterized in that the excipient comprises at least one of a dispersing agent, a wetting agent, an anti-freezing agent, a defoamer, a biocide or a thickener.

3. The synergistic fungicidal composition as claimed in claim 2, characterized in that the dispersing agent comprises at least one of amine salt of phosphate tristyryl phenol ethoxylated, acrylic copolymer, graft copolymer and combinations thereof, and present in an amount in the range from 2 to 10% w/w.

4. The synergistic fungicidal composition as claimed in claim 2, characterized in that the wetting agent comprises at least one of ethoxylated polyarylphenol phosphate ester, dioctyl sulphosuccinate, non-ionic ethoxylate and combinations thereof, and present in an amount in the range from 1 to 5% w/w.

5. The synergistic fungicidal composition as claimed in claim 2, characterized in that the anti-freezing agent comprises at least one of propylene glycol, diethylene glycol, monoethylene glycol and combinations thereof, and present in an amount in the range from 2 to 10% w/w.

6. The synergistic fungicidal composition as claimed in claim 2, characterized in that the defoamer is dimethyl polysiloxane emulsion and present in an amount in the range from 0.01 to 0.5% w/w.

7. The synergistic fungicidal composition as claimed in claim 2, characterized in that the biocide comprises at least one of 20% aqueous dipropylene glycol solution of 1,2-benzisothiazolin-3-one, formaldehyde and combinations thereof and present in an amount in the range from 0.01 to 0.50% w/w.

8. The synergistic fungicidal composition as claimed in claim 2, characterized in that the thickener is xanthan gum and present in an amount in the range from 0.01 to 0.50% w/w.

* * * * *